(12) United States Patent
Ledet et al.

(10) Patent No.: US 6,274,188 B1
(45) Date of Patent: Aug. 14, 2001

(54) METHOD FOR STEAM-COOKING SHRIMP AT REDUCED TEMPERATURES TO DECREASE YIELD LOSS

(75) Inventors: Brent A. Ledet, Jefferson, LA (US); W. Steven Otwell; Murat O. Balaban, both of Gainesville, FL (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 09/558,607

(22) Filed: Apr. 26, 2000

Related U.S. Application Data

(60) Provisional application No. 60/131,242, filed on Apr. 27, 1999.

(51) Int. Cl.⁷ .................................................. A22C 29/00
(52) U.S. Cl. .......................................... 426/510; 426/523
(58) Field of Search ..................... 426/510, 511, 426/523

(56) References Cited

U.S. PATENT DOCUMENTS

| | | | |
|---|---|---|---|
| 3,501,317 | 3/1970 | Veltman | 426/523 |
| 3,581,652 | 6/1971 | Chauvin | 99/334 |
| 3,672,908 | 6/1972 | Hice, Sr. | 99/1 |
| 4,187,325 | 2/1980 | Tyree, Jr. | 426/510 |
| 4,340,613 | 7/1982 | Moore | 426/456 |
| 4,521,439 | 6/1985 | Bengtsson et al. | 426/509 |
| 4,582,047 | 4/1986 | Williams | 126/369 |
| 4,862,794 | 9/1989 | Lapeyre et al. | 99/443 |
| 4,887,524 | 12/1989 | Ellis-Brown | 99/443 C |
| 5,156,873 | 10/1992 | Skrmetta | 426/510 |
| 5,184,538 | 2/1993 | Ledet | 99/331 |
| 5,248,514 | * 9/1993 | Ledet et al. | 426/510 |

FOREIGN PATENT DOCUMENTS

0650682A1   5/1995   (EP) .

OTHER PUBLICATIONS

Inrternational Search Report, PCT/US 00/11351, completion date Aug. 21, 2000.

* cited by examiner

*Primary Examiner*—George C. Yeung
(74) *Attorney, Agent, or Firm*—James T. Cronvich

(57) ABSTRACT

A method for steam-cooking shrimp at reduced temperatures below 100° C. to decrease the loss of shrimp by weight during the cooking process. An exemplary apparatus for carrying out the method of the invention includes a steam cooker with a conveyor belt for continuously transporting shrimp product into and through a cooking chamber open to the atmosphere. Thermostatic controls allow the temperature of the cooking chamber to be adjusted for the proper cooking time depending on the size of the shrimp and their loaded density. The cooking chamber contains a substantially homogeneous gaseous environment of a steam mixture for even cooking. Adjusting the speed of the conveyor belt can control the dwell time of the shrimp in the cooking chamber. Results of testing have shown that, to heat shrimp to an internal temperature of 62.8° C. (a temperature sufficient to kill substantially all bacteria), lower cooking temperatures and longer cooking times than conventionally practiced decrease the loss of weight in cooked shrimp product.

9 Claims, 4 Drawing Sheets

METHOD FOR STEAM-COOKING SHRIMP AT REDUCED TEMPERATURES TO DECREASE YIELD LOSS

CROSS-REFERENCE TO RELATED APPLICATIONS

This application claims the benefit of U.S. Provisional Patent Application No. 60/131,242, filed Apr. 27, 1999.

BACKGROUND

The invention relates to the steam cooking of shrimp and, more particularly, to methods for steam cooking shrimp at reduced temperatures to decrease yield loss in cooked product.

In the bulk processing of shrimp, it is well known to cook shrimp in water baths or steam environments. Shrimp may be cooked in batches in a cooking vessel or continuously transported through an open-ended cooking chamber by a conveyor belt. In many of the batch cookers and some of the continuous cookers, the cooking occurs at elevated pressures. In continuous cookers that are open to the atmosphere and operate at atmospheric pressure, the conventional practice has been to cook shrimp with steam or steam/air mixtures at 212° F. (100° C.). In order to speed up the cooking time, higher temperatures and pressures have conventionally been used.

Cooking shrimp with steam or a steam/air mixture is described in a number of patents: U.S. Pat. No. 3,501,317 to Veltman (at elevated pressure and temperatures from about 220° F. to 260° F.); U.S. Pat. No. 4,340,613 to Moore (at elevated pressure in a retort at temperatures up to 250° F.); U.S. Pat. No. 4,887,524 to Ellis-Brown (at elevated pressure); U.S. Pat. No. 4,862,794 to Lapeyre et al. and U.S. Pat. No. 5,184,538 to Ledet (with saturated steam at 212° F. (100° C.)); and U.S. Pat. No. 5,156,873 to Skrmetta (with air/steam mixture at 212° F. (100° C.) in distinct cooking zones). In all of these patents, steam cooking of shrimp at or above 212 F. (100° C.) is taught as desirable.

As reported in the Veltman patent, it is known that cooking shrimp in water or brine at reduced temperatures, e.g., from 170° F. to 212° F., results in a substantial weight loss. The practice of cooking at high temperatures to reduce cooking time and yield loss has been adopted by both steam cooking processors and water cooking processors.

Owing to the relatively high price of shrimp by weight, the loss of weight in the final cooked product is costly to the shrimp processor. Any decrease in weight loss directly benefits the processor. Consequently, a process or method of commercially cooking shrimp that decreases weight loss would be pleasing to the shrimp processing industry.

The object of the invention is to increase the yield of cooked shrimp through a cooking process that decreases the loss of weight during cooking. Another object of the invention is to cook at atmospheric pressure to eliminate the need for seals or excess steam emission.

SUMMARY

These objectives and others are accomplished by the invention, which provides a method for cooking shrimp in a cooking chamber filled with a substantially homogeneous gaseous atmosphere of a steam mixture at a temperature below 212° F. (100° C.). Preferable cooking temperatures range from 70° C. to just below 100° C., with a range of 85° C. to 95° C. being more preferable, and a temperature of about 88° C. being most preferable. To insure thorough cooking, the dwell time in the cooking chamber is controlled as a function of variables such as temperature in the cooking chamber, size of the shrimp, and quantity of the product in the chamber.

Other versions of the method include using air or a non-reactive gas, i.e., a gas, such as nitrogen, carbon dioxide, or helium, that does not have a chemical reaction with the shrimp product, along with steam, to compose the steam mixture and provide the cooking environment. In another version, the mixture of steam and air or non-reactive gas could be premixed in predetermined proportions in a high-pressure line before injection into the cooking chamber. The temperature of the mixture in the high pressure line could be adjusted and its injection rate controlled to regulate the temperature in the cooking chamber to a predetermined level below 212° F. (100° C.) to cook the shrimp with less loss of yield.

DRAWINGS

These and other aspects, advantages, and features of the invention will become more apparent by reference to the following description, appended claims, and accompanying drawings in which:

DESCRIPTION

Figure 1:
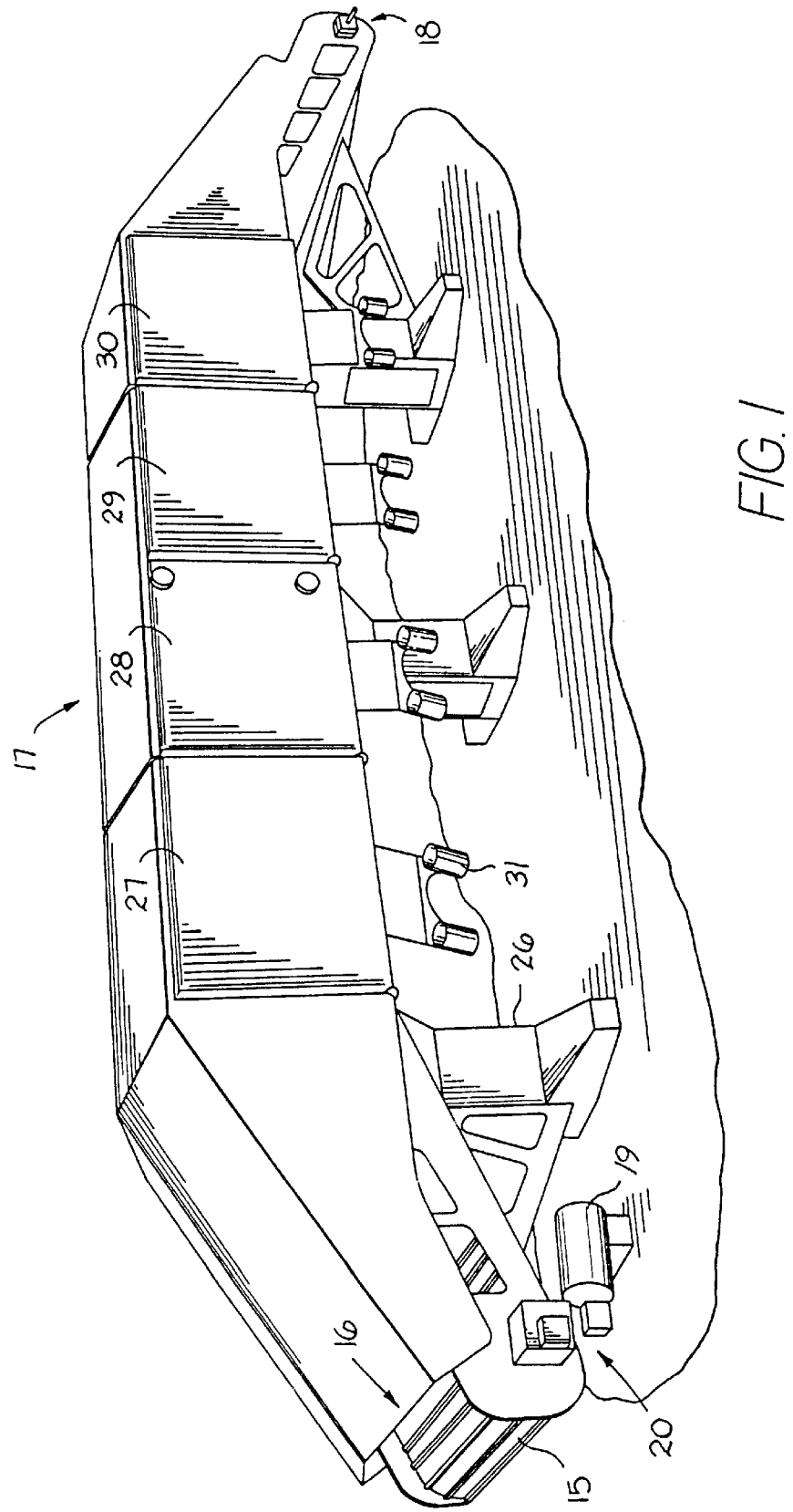
FIG. 1 is a perspective view of a steam cooker capable of being used according to the method of the invention.
Figure 2:
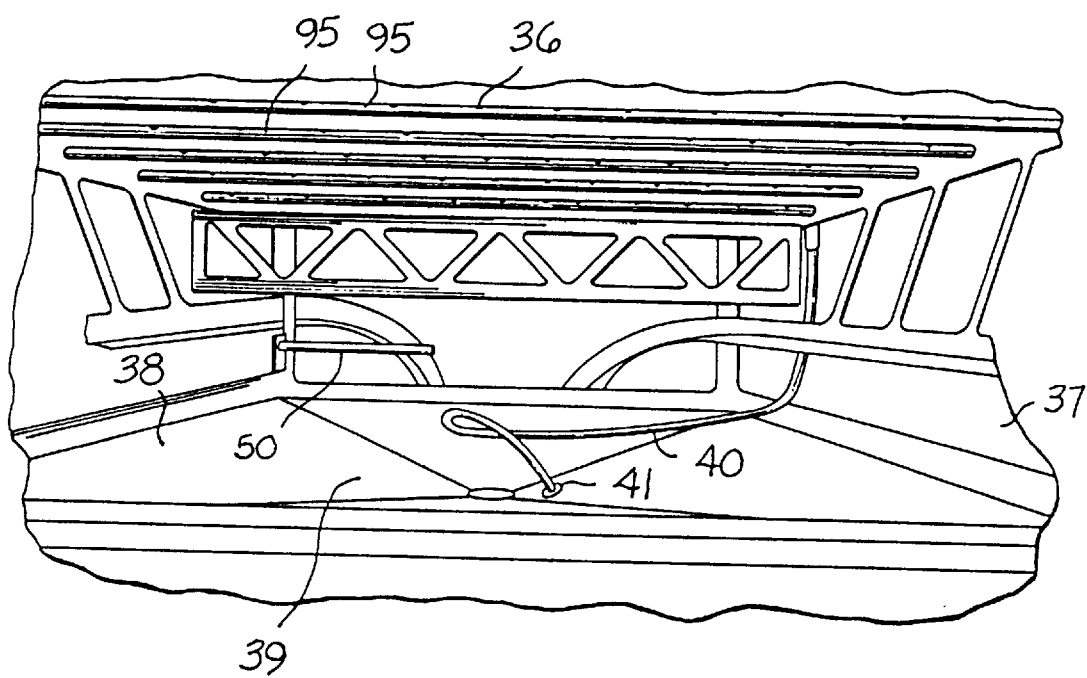
FIG. 2 is a cut away view looking into the interior of the cooker of FIG. 1.

FIGS. 1 and 2 show an example of one cooking apparatus capable of performing the method of the invention. As seen from FIG. 1, a product to be cooked, such as raw shrimp, is loaded on a conveyor belt 15 at an entrance port 16 for transport through a cooker cabinet 17 toward an exit port 18. The cooking chamber inside the cooker cabinet is open to the atmosphere through the two ports. No seals are needed. A drive motor 19 and belt speed control system 20 is provided for varying the dwell time of the shrimp product on the belt in the cooker as a cooking control feature. Thus, as required for cooking products of different sizes or different loading densities on the belt, a desired cooking dwell time can be established by controlling belt speed. Lower cooking temperatures typically require longer dwell times. The belt permits the continuous transport of shrimp through the cooker without interruption of product flow. Support legs 26 include leveling adjustments. Doors 27–30 are moved downwardly against brackets 31 for access into the internal cooking region for easy access to the inside of the cooker.

A lower portion of the internal cooking region is seen in FIG. 2 looking toward the belt entrance port 16 without the belt in place. Disposed in an upper cooking zone is an interconnected manifold or set of steam inlet pipes 95 dispersed along the cooking chamber for introducing cooking gases, such as steam or a steam mixture that could include air or a non-reactive gas such as nitrogen, carbon dioxide, or helium. Multiple outlet holes or slits 36 in steam pipe 95 release steam into the cooking chamber to cook the product on the belt 15, which rides just above the steam inlet pipes. A thermostat sensor 50 is positioned in the lower part of the cooking chamber and is coupled to a steam control system 50B controlling a flow control valve 50A that passes steam from a steam source 58 into the cooking chamber, as shown schematically in FIG. 3. A steam line 40 passes into the cooker through an opening 41 in the bottom 38 of the cooking chamber. The steam line is connected to the inlet pipes 95. The bottom of the chamber is sloped to funnel condensate to a drain or water treatment or recovery system.

The control system is adjusted to let in just enough steam to maintain a predetermined temperature at the thermostat. If the temperature is set high enough, the cooking chamber will be filled with a pure steam environment at 100° C., unless convection is optionally enabled by fans 55 or other means for mixing air with the steam and providing a substantially homogeneous steam/air mixture for even cooking. Merely lowering the thermostat setting will ensure that air is drawn into the cooking region through the entrance and exit ports to mix with the steam. Thus, we are suggesting that natural or forced convection or other means for intentionally mixing air with steam into a homogeneous cooking environment to lower the cooking temperature be used. The temperature at the thermostat is known as a function of the temperature in the product cooking region of the chamber. It would alternatively be possible to position the thermostat closer to the cooking region for a direct indication of cooking temperature.

Figure 3:
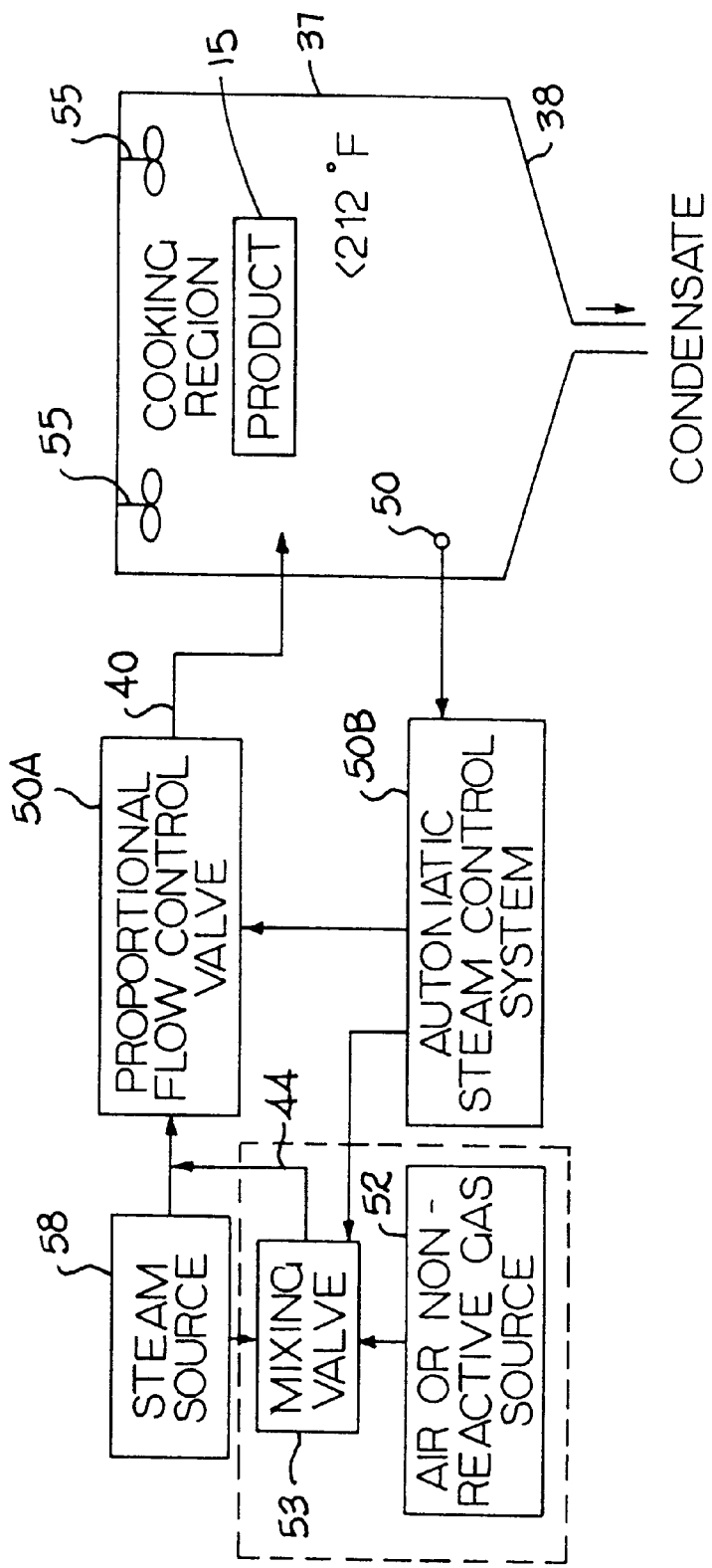
FIG. 3 is a system block diagram systematically illustrating cooker control features associated with the cooker of FIG. 1.

An optional source of cooking gases is shown in the dashed-line box of FIG. 3 by a source 52 of air or a non-reactive gas, such as nitrogen, carbon dioxide, or helium. Non-reactive gases such as these do not react substantially with the shrimp product and may also have better heat transfer characteristics than air to reduce cooking time. A control valve 53 allows the air or non-reactive gas to be mixed with the steam in a steam line 44. The control 50B can premix the steam and air or non-reactive gas in predetermined proportions and at a predetermined temperature and injection rate depending on product size and density.

Although the cooking apparatus shown in FIGS. 1–3 can be used to practice the method of the invention without the use of water seals and without the limitations of batch cooking, other cookers, such as batch retorts, water-seal blanchers, and auger-type cookers, could be used. All of these are capable of producing a homogeneous cooking environment through convection, premixing of cooking gases, or other means.

The method of cooking shrimp at temperatures below 212° F. (100° C.) was arrived at based on trials performed to test our theory that low-temperature steam cooking would produce higher yields than conventional high-temperature steam cooking or even water cooking. To test our theory, we performed the trials at the University of Florida. The trials are now described.

Blocks of frozen, peeled white shrimp, *P. setiferus,* were obtained from commercial processors in the northern Gulf of Mexico during September 1998. Two sizes were obtained and categorized as large (36–40 counts/lbs) and small (71–91 counts/lbs). The actual size ranges were slightly smaller than labeled on the frozen packages, and the small shrimp were soft and showed some initial signs of thermal abuse. All shrimp was thawed at 4° C. prior to the individual trials.

The shrimp had no previous exposure to any phosphating agents or treatments to retain moisture content. This condition was confirmed by analyzing each shrimp size for total moisture and phosphorus (P) content (Table 1). Peeled shrimp that has been exposed to phosphates will have a total phosphorus content in excess of 250 mg P/100 g of raw shrimp muscle tissue. The resulting moisture contents were typical for peeled shrimp. The initial moisture content was lower in the large shrimp.

TABLE 1

| Method of Analysis | Small Shrimp (71/91 count) (Average of triplicates) | Large Shrimp (36/40 count) (Average of triplicates) |
| --- | --- | --- |
| Moisture - AOAC (Assoc. of Official Analytical Chemists) | 82.7% | 80.5% |
| Total Phosphorus - AOAC | 230 mg/100 g | 205 mg/100 g |

Light transmissions through samples before and after reaching different temperatures were measured in order to gain insight into the changes in the tissue of shrimp during cooking. Water bath temperatures of 50, 55, 60, 65, 70, 80 and 90° C. were chosen. Thin slices of heated shrimp (3.5 mm thick) were carefully cut from the tail sections of both small and large shrimp. Triplicate samples were used for each temperature. The slices were placed in a light box specifically designed for color reading for food products. Both front and back-lighting were used. A CCD camera took the video picture of the slice. The Color Analysis Computer Program developed by the University of Florida analyzed the color information and converted it to the customary L, a, b color coordinate system. The ratio of the L value before cooking to that after cooking was calculated. As a measure of opacity, the L ratios were plotted against the cooking temperature in FIG. 4.

Both small and large shrimp were thermally treated in hot water and in steam. The heating medium temperatures were set to 185, 195 and 212° F. (85, 90.6 and 100° C.). The internal temperature at the slowest heating point (internal) was set to 145 and 180° F. (62.8 and 82.2° C.). The 145° F. (62.8° C.) internal temperature value represents the minimum temperature for cooking seafoods for 15 seconds to meet FDA requirements. Meeting the requirements eliminates or reduces potential pathogenic organisms to acceptable levels. In other words, 145° F. (62.8° C.) is a biologically safe internal target temperature for cooking shrimp. Cooling was done by immersing the shrimp in an ice-water slush. Preliminary experiments were performed to obtain the precise times, at different conditions, to take the shrimp out of the heating medium and place them in the ice-slush in order to reach the desired internal temperature.

A raw shrimp sample of about 200 g was weighed for each combination of cook conditions. From this sample, a 4.5 g shrimp for the small, and a 10 g shrimp for the large, categories were chosen to be fitted with thermocouples. Manual weighings showed that these were the "average" weights for the respective size categories. A 36 gauge T-type thermocouple was inserted into the center of the thickest part of each shrimp (second segment). At least three shrimp were fitted with thermocouples since it is quite difficult to find the exact cold point of the shrimp. If the thermocouple is not placed at the slowest heating point, the temperature will rise and fall quicker. Therefore, the shrimp with the slowest heating curve was taken. This also compensated for the size differences in shrimp.

In preliminary experiments, shrimp were placed in a narrow wire mesh cooking basket. This proved inadequate since some shrimp were stacked and insufficient heating occurred. A wire mesh container was built to address this problem. The reported data were taken using this container. After cooking, shrimp were taken out of the slush and placed in a sieve for five minutes before final weighing and analysis for moisture content.

Post-cook treatment trials with cold ice slush and/or phosphating treatments were applied in order to determine influence on the resulting product yield. Preliminary trials used only boiling water (100° C.) to reach an internal temperature of 62.8° C. (145° F.). After boiling, the shrimp were cooled in ice slush or chilled solutions of 2% and 4% sodium tripolyphosphate (STP: A&B Chemical Co.). The cooled shrimp were weight and analyzed for total moisture content.

Similarly, shrimp from the aforelisted cooking trials using hot water were cooled in ice water or a chilled 4% solution of sodium tripolyphosphate (STP: A&B Chemical Co.). The exposure time was five minutes prior to removal for weighing and moisture determinations.

Figure 4:
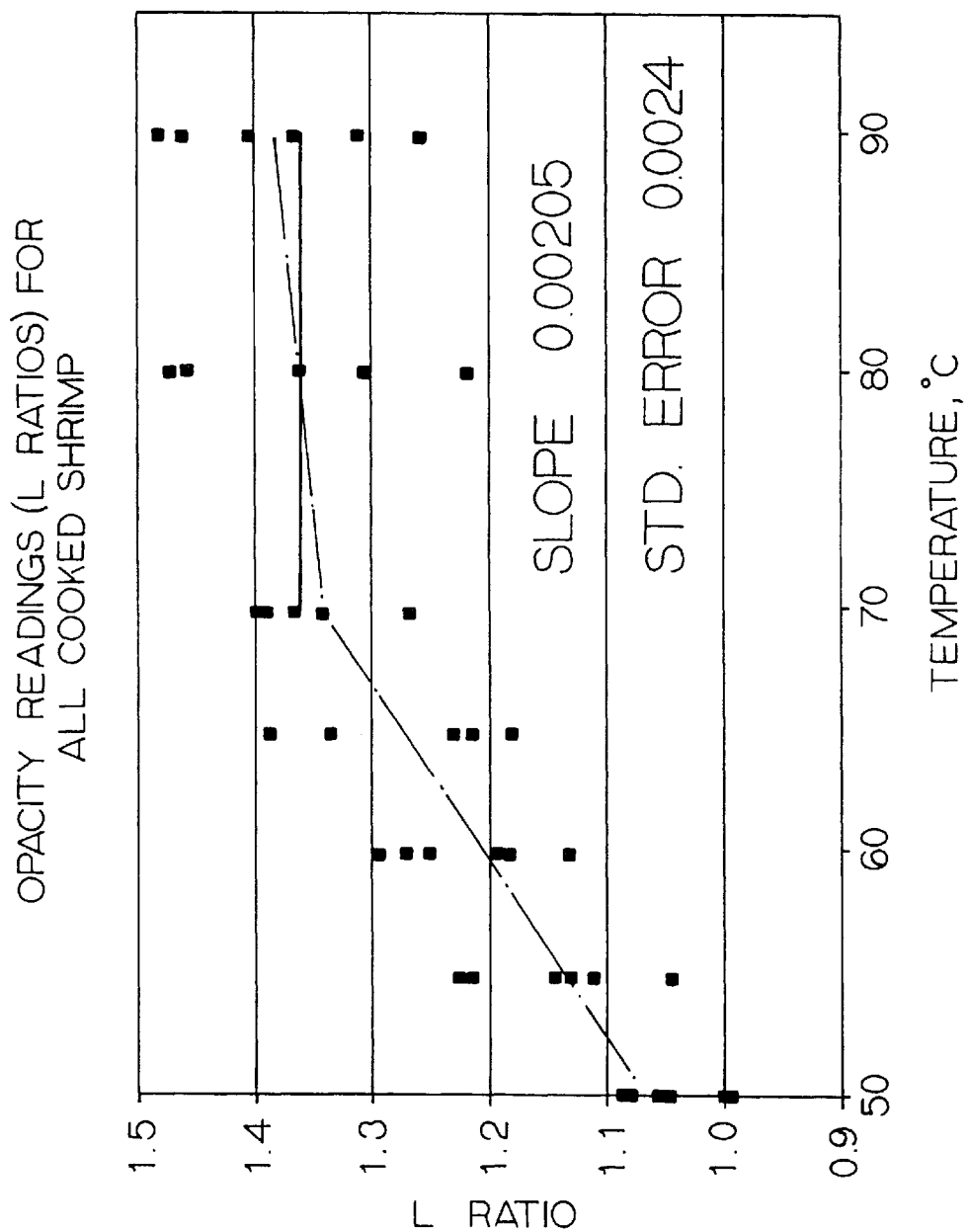
FIG. 4 is a graph showing opacity readings for cooked shrimp versus cooking temperature, which confirms the use of cooking parameters according to the method of the invention.

FIG. 4 shows the L ratio values vs. temperature for all samples (pooled for small and large shrimp). The large variation in the data can be due to several factors. It is crucial to have consistent thickness in a given sample and among samples. Alternative sample preparation is necessary to improve the readings. Also, when cooked in an unrestrained form, shrimp muscle shrinks, especially at higher temperatures. Changes in the thickness of the slices can influence light transmission. Optional cuts may help alleviate this problem.

Regardless of variations due to sample preparation, there was an emerging pattern due to cooking. As we expected, the initial uncooked shrimp provided an L ratio that did not deviate from 1 at 50° C. Between 55° and 70° C. internal temperature, there is a steady increase in the L ratio. This suggests that there are changes in the muscle structure of the shrimp. Above 70° C. the L ratio does not change drastically. In fact, it can be argued that the slope of the L ratio vs temperature is zero. This suggests the unexpected result that at around 70° C., cooking is accomplished and no more changes occur within the temperature range used. The results of the opacity testing suggest that high temperature cooking, as conventionally practiced, is often overkill.

Table 2 shows the results for the various cooking combinations. The lower cooking temperatures with steam provided the better yields. This advantage for steam cooking was reduced relative to cooking in hot water as the cooking temperatures increased. Through all cooking conditions the larger shrimp lost more yield, and the higher internal cook temperatures resulted in lower yields for both shrimp sizes.

Steam cooking appears to be advantageous relative to product yield and processing convenience. This advantage is more obvious at lower temperatures and lower internal cook temperatures which can be achieved with more controls through the application of steam.

Cooking Times (sec) for 45/lb and 100/lb white shrimp for the center to reach a certain temperature (° C.) during thermal processing with steam or hot water.

TABLE 2

| Size | Highest Center Temperature (° C.) | Cooking Temperature (° C.) | Cooking Time (sec) | Yield Loss % (by weight) Stream | Yield Loss % (by weight) Water |
|---|---|---|---|---|---|
| 45/lb | 62.8 | 85 | 120 | 3.3 | 15.0 |
|  |  | 90.6 | 108 | 8.0 | 12.3 |
|  |  | 100 | 90 | 17.4 | 13.0 |
|  | 82.2 | 85 | 282 | 11.0 | 17.8 |
|  |  | 90.6 | 204 | 16.0 | 17.1 |
|  |  | 100 | 156 | 22.6 | 22.5 |
| 100/lb | 62.8 | 85 | 67 | 9.6 | 15.7 |
|  |  | 90.6 | 60 | 13.8 | 13.0 |
|  |  | 100 | 54 | 25.7 | 17.4 |
|  | 82.2 | 85 | 156 | 22.5 | 29.8 |
|  |  | 90.6 | 108 | 25.7 | 27.2 |
|  |  | 100 | 84 | 30.7 | 29.7 |

The test results suggest a departure from the traditional practice of minimizing cook time to the practice of longer steam cooking times in a lower temperature environment. The test results show, at a center temperature of 62.8° C., an 11.7% yield advantage for 45/lb shrimp with a 33% increase in time over 100° C. steam cooking time; for 100/lb shrimp, a 20% increase in time gives a 6.1% increase in yield. Both cases are for an 85% steam bath temperature. Based on these results, we think a preferable range of cooking temperatures is from about 70° C. to just under 100° C., with about 85° C. to about 95° C. being more preferable, and about 88° C. being most preferable. Thus, for steam cooking shrimp, lower cook temperatures, contrary to conventional wisdom, result in less weight loss than at high temperatures. In our opinions, the tradeoff of longer cooking times is worth the gains in product weight.

Although the method of the invention has been described in detail with reference to a specific kind of cooking apparatus, it could be used with other kinds of apparatus, such as those briefly mentioned. Those skilled in the art will readily appreciate that other steam-cooking apparatus could be used without materially departing from the novel teachings of the method of the invention. As a consequence, the specific apparatus used to exemplify the method of the invention is not meant to limit the scope of the invention as defined in the following claims.

We claim:

1. A method for cooking shrimp, comprising:
    a) putting shrimp in a cooking chamber open to the atmosphere;
    b) subjecting the shrimp in the cooking chamber at atmospheric pressure to a homogeneous gaseous atmosphere comprising steam;
    c) controlling the temperature of the gaseous atmosphere in the cooking chamber to a cooking temperature of below 100° C.; and
    d) controlling the dwell time of the shrimp in the cooking chamber as a function of the cooking temperature so as to insure thorough cooking of the shrimp.

2. The method for cooking shrimp as in claim 1, wherein the temperature is controlled to within a range between about 70° C. and 100° C.

3. The method for cooking shrimp as in claim 2, wherein the temperature ranges from about 85° C. to 95° C.

4. The method for cooking shrimp as in claim 3, wherein the temperature is about 88° C.

5. The method for cooking shrimp as in claim 1 wherein the gaseous atmosphere further comprises a non-reactive gas that does not react substantially with the shrimp, the non-reactive gas forming a mixture with the steam.

6. The method for cooking shrimp as in claim 5, wherein the non-reactive gas is selected from the group consisting of nitrogen, carbon dioxide, and helium.

7. The method for cooking shrimp as in claim 1, further comprising:
   premixing the steam with air or a non-reactive gas in predetermined proportions;
   controlling the proportions of the mixture; and
   injecting the mixture into the cooking chamber as required to maintain the cooking temperature.

8. The method for cooking shrimp as in claim 1, further comprising mixing air with the steam to form the gaseous atmosphere.

9. The method for cooking shrimp as in claim 1, wherein the dwell time of the shrimp in the cooking chamber is controlled by controlling the speed of a conveyor belt transporting the shrimp continuously through the cooking chamber.

* * * * *